(12) United States Patent
Giaretta et al.

(10) Patent No.: US 7,224,904 B1
(45) Date of Patent: May 29, 2007

(54) DIGITAL CONTROL OF OPTICAL TRANSCEIVER TRANSMITTING AND RECEIVING ELEMENTS

(75) Inventors: Giorgio Giaretta, Mountain View, CA (US); Andreas Weber, Los Altos, CA (US); Dan Case, Gilroy, CA (US)

(73) Assignee: Finisar Corporation, Sunnyvale, CA (US)

( * ) Notice: Subject to any disclaimer, the term of this patent is extended or adjusted under 35 U.S.C. 154(b) by 567 days.

(21) Appl. No.: 10/282,669

(22) Filed: Oct. 29, 2002

(51) Int. Cl.
*H04B 10/00* (2006.01)

(52) U.S. Cl. ...................... 398/135; 398/138; 398/164

(58) Field of Classification Search ................ 398/135, 398/138, 164
See application file for complete search history.

(56) References Cited

U.S. PATENT DOCUMENTS

| | | | |
|---|---|---|---|
| 4,916,705 A | 4/1990 | Glance | |
| 5,019,769 A | 5/1991 | Levinson | |
| 5,383,208 A | 1/1995 | Queniat et al. | |
| 5,442,321 A | 8/1995 | Bayruns et al. | |
| 5,479,288 A | 12/1995 | Ishizuka et al. | |
| 5,502,785 A | 3/1996 | Wang et al. | |
| 5,537,093 A | 7/1996 | Aunon et al. | |
| 5,734,300 A | 3/1998 | Yoder | |
| 5,861,908 A | 1/1999 | Tonosaki et al. | |
| 5,878,015 A | 3/1999 | Schell et al. ................ | 369/116 |
| 5,933,264 A | 8/1999 | Van Der Heijden | |
| 5,956,168 A | 9/1999 | Levinson et al. | |
| 6,130,562 A | 10/2000 | Bosch et al. ................ | 327/109 |
| 6,333,804 B1 | 12/2001 | Nishiyama et al. | |
| 6,400,857 B1 | 6/2002 | Hatami-Hanza et al. | |
| 6,414,974 B1 | 7/2002 | Russell et al. | |
| 6,446,867 B1 * | 9/2002 | Sanchez ..................... | 235/454 |
| 6,665,498 B1 * | 12/2003 | Jiang et al. ................. | 398/135 |
| 2002/0071164 A1 | 6/2002 | Lauge et al. | |
| 2002/0181894 A1 * | 12/2002 | Gilliland et al. ............. | 385/88 |
| 2002/0196501 A1 * | 12/2002 | Buss et al. .................. | 359/152 |

FOREIGN PATENT DOCUMENTS

WO  WO 01/48471 A2  7/2001

* cited by examiner

*Primary Examiner*—Dalzid Singh
(74) *Attorney, Agent, or Firm*—Workman Nydegger

(57) ABSTRACT

An optical transceiver module having a digital control interface is disclosed. The optical transceiver module comprises a controller and integrated post-amplifier/laser driver, which are included on a printed circuit board disposed in the module. Transmitting and receiving optical sub-assemblies are also disposed in the module. A digital signal interface interconnects the controller with the integrated post-amplifier/laser driver. Digital control signals produced by the controller are transmitted via the digital signal interface to the integrated post-amplifier/laser driver. After receipt by the integrated post-amplifier/laser driver, the digital control signals are converted to analog control signals and forwarded to control amplifiers that use the control signals to vary a plurality of operating parameters of the transceiver module. The digital signal interface can also be employed to provide feedback to the controller relating to the operation of the control devices.

14 Claims, 3 Drawing Sheets

DIGITAL CONTROL OF OPTICAL TRANSCEIVER TRANSMITTING AND RECEIVING ELEMENTS

BACKGROUND OF THE INVENTION

1. The Field of the Invention

The present invention generally relates to optical transceivers. In particular, the present invention relates to structures and methods for digitally controlling various operational parameters of optical transceivers.

2. The Related Technology

Fiber optic technology is increasingly employed as a method by which information can be reliably transmitted via a communications network. Networks employing fiber optic technology are known as optical communications networks, and are marked by high bandwidth and reliable, high-speed data transmission.

Optical communications networks employ optical transceivers in transmitting information via the network from a transmission node to a reception node. An optical transceiver at the transmission node receives an electrical signal from a network device, such as a computer, and converts the electrical signal via a laser to an optical signal. The optical signal can then be transmitted in a fiber optic cable via the optical network, such as a LAN backbone, for instance. The optical signal is then received by a reception node of the network. Once received by the reception node, the optical signal is fed to another optical transceiver for conversion into electrical signals. The electrical signals are then forwarded to a host device, such as a computer, for processing. The optical transceivers described above have both signal transmission and reception capabilities; thus, the transmitter portion of the transceiver converts an incoming electrical signal into an optical signal, whereas the receiver portion of the transceiver converts an incoming optical signal into an electrical signal.

The majority of components included in the optical transceiver are disposed on a printed circuit board ("PCB"). These components include a controller, which governs general operation of the transceiver, a laser driver for controlling operation of the laser in the transmitter portion, and a post-amplifier for controlling the conversion of incoming optical signals into electrical signals in the receiver portion. These components are typically disposed as integrated circuits on the PCB.

The controller is operably connected to both the laser driver and the post-amplifier in order to govern their operation and to ensure proper transceiver function. In particular, the controller is responsible for controlling one or more parameters associated with these components during operation of the transceiver. Examples of these operational parameters include the rise time and amplitude of the electrical data signal that is conditioned by the laser driver, the rise time and amplitude of the data signal conditioned by the post-amplifier, and hysteresis and threshold set points for loss of signal detection circuitry in the post-amplifier. Each of these operational parameters is adjusted by a control device, such as a control amplifier, that is disposed on either the post-amplifier or the laser driver. In known systems, the controller controls the operational parameters via a plurality of analog signal lines that interconnect the controller with the respective control amplifier disposed on the laser driver or the post-amplifier. Because of their analog nature, one analog control line extending between the controller and the respective control amplifier is typically required for each parameter over which control is desired. This creates added complexity and expense to the design and manufacture of the transceiver PCB. Additionally, this requires each IC to be larger in size.

There is therefore a need for an optical transceiver that enables control over the various operational parameters of the transceiver components while minimizing the complexity and cost of the transceiver.

BRIEF SUMMARY OF THE INVENTION

Briefly summarized, embodiments of the present invention are directed to an optical transceiver device having digital control of various parameters associated with operation of the device. The digital control design of the present transceiver device enables it to be manufactured with minimum complexity, thereby enhancing its economy. Digital control of the transceiver device also allows the functionality of the device to be expanded by providing additional elements of control and monitoring of device functions.

In one embodiment, the present optical transceiver comprises a controller chip coupled to a laser driver and post-amplifier. Each of these components is disposed on a printed circuit board, which is at least partially contained within a transceiver module housing. The laser driver and post-amplifier are preferably integrated as a single component on the printed circuit board, providing certain operational advantages and economy. The integrated laser driver/post-amplifier governs the operation of both a transmitter optical sub-assembly, which is used to convert an electrical data signal into a modulated optical signal and transmit it to an optical communications network, and a receiver optical sub-assembly, which receives modulated optical signals from the network and converts them back to electrical data signals for use by one or more connected components. The transmitter and receiver optical sub-assemblies, the integrated laser driver/post-amplifier, and the controller are interconnected so as to function together in transmitting and receiving optical signals.

In accordance with embodiments of the present invention, a digital interface is established between the controller and the laser driver/post-amplifier to enable digital control of transceiver elements. The digital interface comprises digital serial interface nodes disposed on both the controller and the integrated laser driver/post-amplifier, with digital signal lines disposed therebetween. Preferably, three digital signal lines for transmitting data, enable, and clock signals are disposed between the digital interface nodes.

During operation of the optical transceiver, the controller issues digital control signals intended for use by one of a plurality of control devices disposed in the laser driver/post-amplifier. These digital control signals are relayed from the controller's serial interface node to the laser driver/post-amplifier serial interface node via the digital signal data line. After receipt by the laser driver/post-amplifier interface node, the digital control signal is distributed to one of a plurality of digital-to-analog converters disposed on the laser driver/post-amplifier. A glue logic device also disposed on the laser driver/post-amplifier selects the appropriate digital-to-analog converter to be used in converting the digital control signal. The digital control signal is converted by the digital-to-analog converter into an analog control signal, then relayed to the appropriate control device of the laser driver/post-amplifier, such as a control amplifier, or other device. The analog control signal is used by the control device to modify a specified operational parameter related to the post-amplifier/laser driver. Examples of such operational parameters include the amplitude or rise time of the data signal transmitted or received by the transceiver, and loss of signal threshold settings for received data signals, among others.

In one embodiment, digital control signals are transmitted from controller to post-amplifier/laser driver in a one-way configuration. In another embodiment, data can be sent in both directions between these two components, enabling not only control signals to be transmitted to the post-amplifier/laser driver, but also for feedback signals to be conveyed from the post-amplifier/laser driver back to the controller. This enables the controller to govern transceiver operation based upon real time data provided by the post-amplifier/laser driver.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
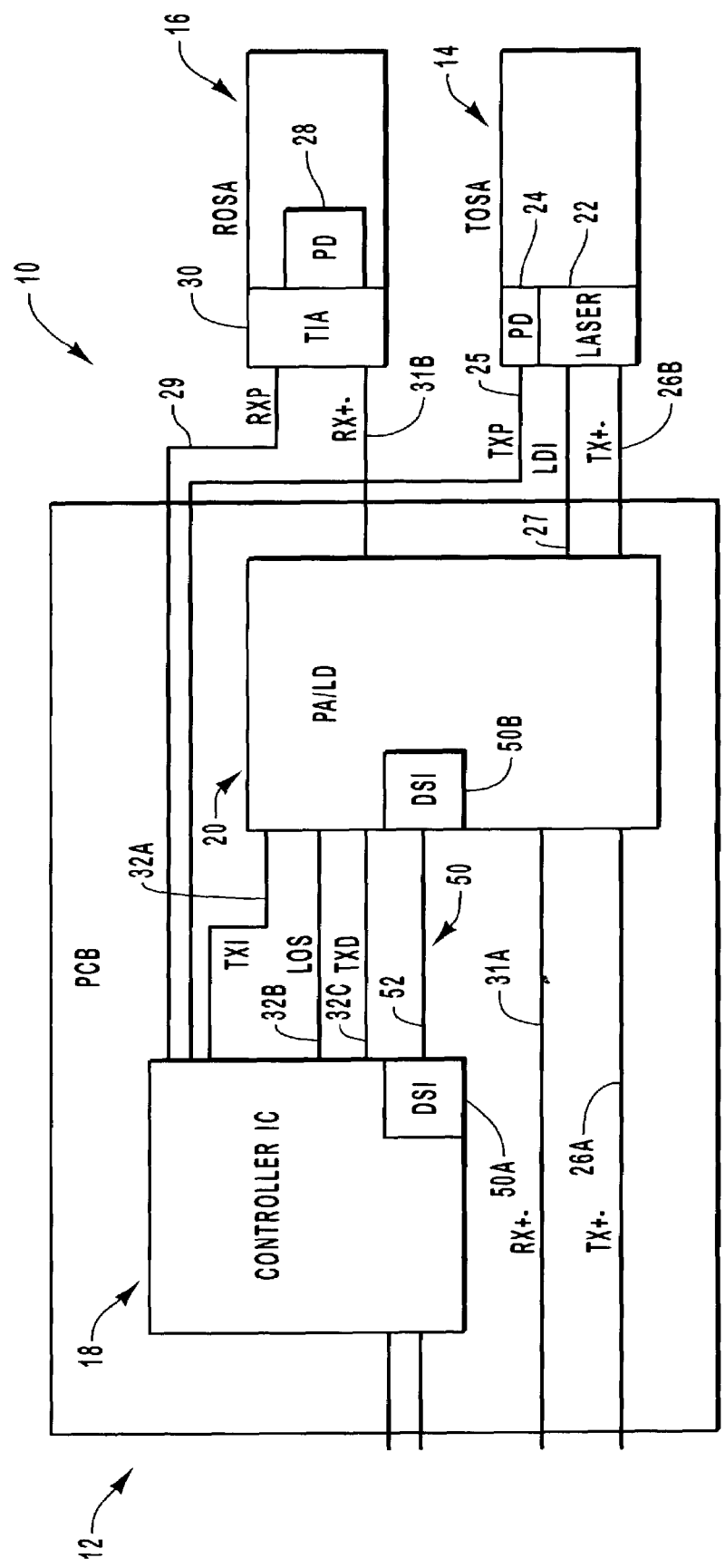
FIG. 1 is a schematic view of various components comprising an optical transceiver manufactured in accordance with one embodiment of the present invention.
Figure 2:
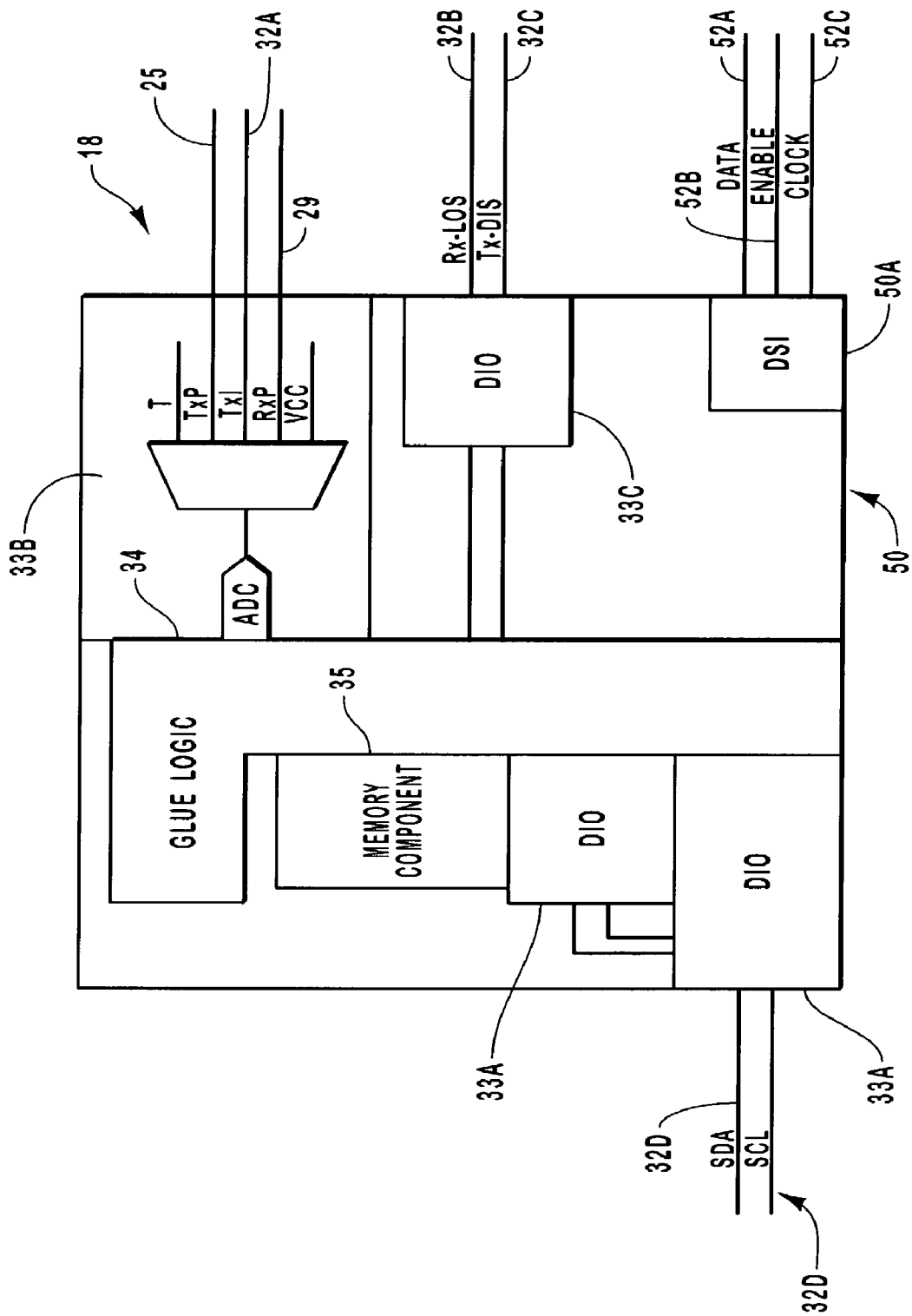
FIG. 2 is a schematic view of the controller of FIG. 1, configured in accordance with one embodiment of the present invention.
Figure 3:
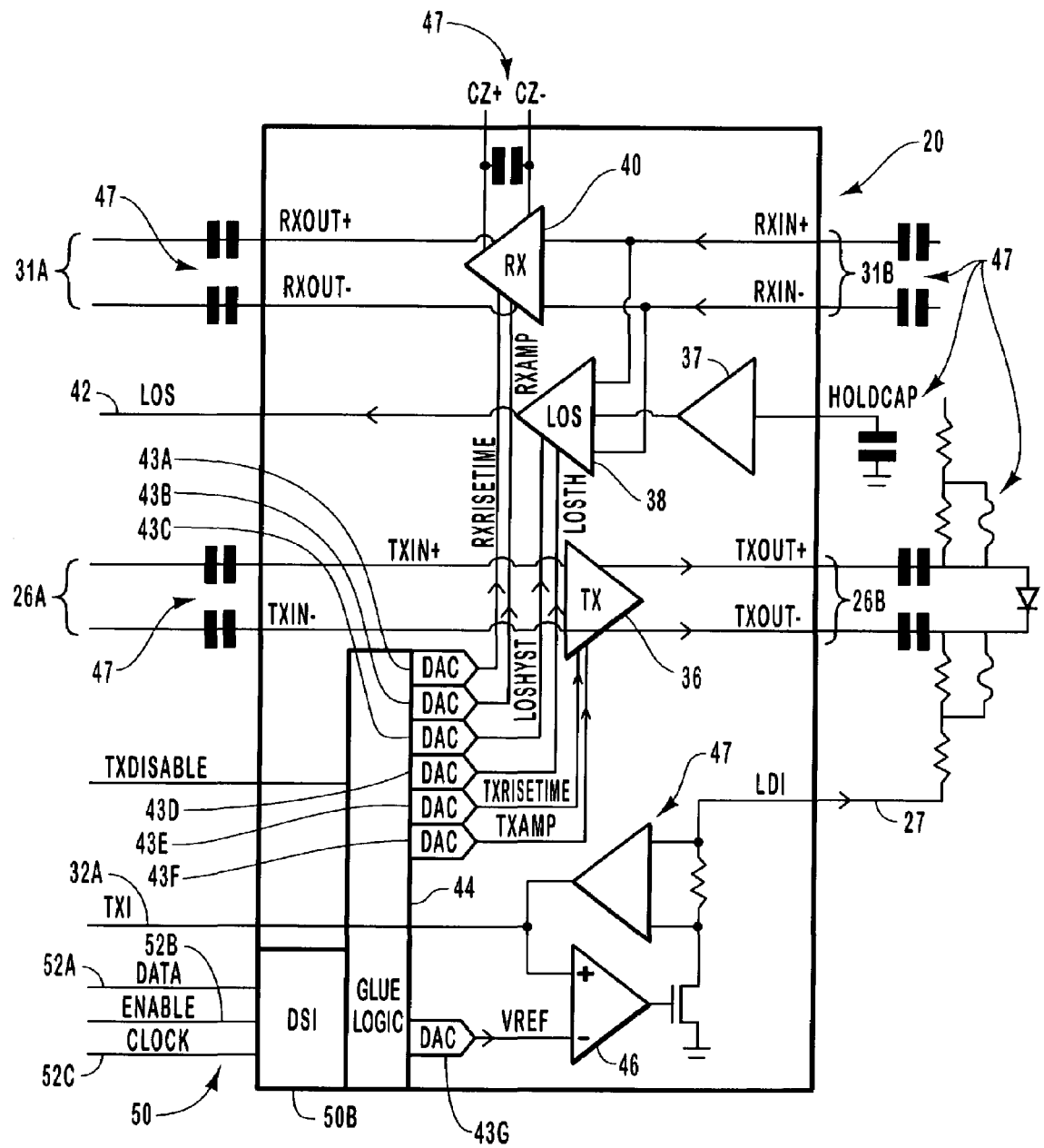
FIG. 3 is a schematic view of the post-amplifier and laser driver of FIG. 1, configured in accordance with one embodiment of the present invention.

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale. FIGS. 1–3 depict various features of embodiments of the present invention, which is generally directed to an optical transceiver that is configured to enable digital control of various operating parameters of the transceiver.

Reference is first made to FIG. 1, which depicts various components comprising an optical transceiver, generally designated at 10. The transceiver 10 generally includes a printed circuit board ("PCB") 12, a transmitter optical subassembly ("TOSA") 14, and a receiver optical subassembly ("ROSA") 16.

Both the TOSA 14 and the ROSA 16 are electrically connected to a controller 18 and a post-amplifier/laser driver ("PA/LD") 20, which are in turn disposed on the PCB 12. Generally, these components cooperate to enable the transceiver 10 both to transmit and to receive optical signals that travel via an optical communications network (not shown). For instance, the PA/LD 20 is responsible for conditioning data signals that are to be transmitted by the TOSA 14, as well as conditioning data signals received by the ROSA 16. As will be explained, the controller 18 is responsible for governing the operation of the TOSA 14, ROSA 16, and other components that comprise the optical transceiver 10.

In greater detail, the PA/LD 20 can receive an electrical data signal to be transmitted from a connected device, such as a computer (not shown), via line 26A. The PA/LD 20 conditions that signal for receipt by the TOSA 14 via line 26B. A laser 22, disposed in the TOSA 14 and powered by a DC current that is conducted via current line 27 (indicated by "LDI" for "laser driver current"), receives the conditioned electrical data signal and converts it into an optical data signal for transmission to the optical communications network. A photodiode 24 is also disposed in the TOSA 14 to monitor the operation of the laser 22. Specifically, the photodiode 24 can communicate data relating to the light power with which the laser 22 is transmitting to the controller 18 via a communication line 25, indicated by "TXP" for "transmitter power."

Analogous to the above discussion, an incoming optical data signal from the optical communications network can be received by the optical transceiver 10 into the ROSA 16. A photodiode 28 and amplifier 30 in the ROSA 16 cooperate to convert and initially amplify the optical data signal into an electrical data signal, which is then forwarded to the PA/LD 20 via line 31B for conditioning before being forwarded to a connected device, such as a computer (not shown) via line 31A. Information regarding the power at which the ROSA 16 is receiving the optical data signal from the communications network can be relayed to the controller 18 via a communication line 29, indicated by "RXP" for "receiver power."

As shown in FIG. 1, The PA/LD 20 and the controller 18 are interconnected via various communication/control lines. A line 32A extends between the controller 18 and the PA/LD 20 (indicated by "TXI" for "transmitter current") to provide information to the controller 18 concerning the current level supplied to the laser 22 by the LDI line 27. A line 32B extends between the PA/LD 20 and the controller 18 (indicated by "LOS" for "loss of signal") to indicate when the signal received by the ROSA 16 is below detectable levels. A line 32C extends between the PA/LD 20 and the controller 18 (indicated by "TXD" for "transmitter disable") to allow the controller to disable operation of the TOSA 14 when transmission of an optical signal is not desired. Communication lines 32D extending from the controller 18 can be connected with a host device (not shown) to provide identification information and other data relating to transceiver operation to the host device.

Note that the presence of the lines described above are exemplary in accordance with one embodiment of the present invention; thus, the particular implementation of control and communication lines as illustrated in FIGS. 1–3 are not meant to limit the present invention in any way. Thus, alternative or additional lines can also be included.

FIG. 1 further illustrates a digital interface according to one embodiment of the present invention. In the illustrated embodiment, this digital interface comprises a digital serial interface 50 interposed between and interconnecting the PA/LD 20 and the controller 18. As discussed, the digital serial interface 50 enables digital control of transceiver operations by the controller 18. Further details concerning the digital serial interface 50 will be given hereafter.

Reference is now made to FIG. 2, which depicts various aspects of the controller 18. In one embodiment, the controller 18 comprises an integrated circuit disposed on the PCB 12 and having various sub-components, some of which are explained here. The controller 18 includes a glue logic device 34 responsible for managing and distributing controller data and digital control signals relating to the operation of transceiver components, such as the integrated PA/LD 20. A memory component 35 comprising memory arrays, registers, or a combination of both, is disposed in the controller 18 to enable information relating to the operation of the transceiver 10 to be stored. The information stored in the memory component 35 can be gathered from the TOSA 14, ROSA 16, the PA/LD 20, or from various other transceiver components. In one embodiment, the information stored by the memory component 35 can be forwarded to the host device via the communication lines 32D.

The controller 18 further includes various interfacing components to enable the controller to communicate with various devices. For example, digital input/output nodes 33A are disposed on the controller to facilitate communication between the memory component 35 and host device (not shown) via communication lines 32D. Data signals sent from the TOSA 14, the ROSA 16, and the PA/LD 20 via communication/control lines 25, 29, and 32A, respectively, are received by the controller 18 via an interface 33B. In a similar manner, signals carried on lines 32B and 32C relating to the receiver loss of signal and transmitter disabling can be received and dispensed by the controller 18 via a digital input-output interface 33C. Finally, a digital node 50A of the digital serial interface 50 is disposed on the controller 18 to interface with a corresponding digital node on the PA/LD 20 via the digital signal lines 52 in accordance with one embodiment of the present invention and as described in further detail below.

It should be remembered that the above interfacing configuration as shown in FIG. 2 is but one possible configuration for the various inputs and outputs associated with the operation of the controller 18. Accordingly, the above description should not be construed to limit the present invention in any way. Furthermore, several of the input and output signals discussed above are either digital or analog; however, the digital or analog nature of any specific signal can be modified from what is illustrated or described herein as may suit a particular application.

As already mentioned, one of the primary responsibilities of the controller 18 is to govern the operation of the TOSA 14 and ROSA 16 such that the electric and optical data signals associated therewith are properly converted, transmitted, and received in relation to the communications network and connected devices. The controller 18 governs the TOSA 14 and ROSA 16 via control components disposed in the PA/LD 20 as detailed below. The PA/LD control components are governed by the controller 18 via control signals that are transmitted from the controller to the components. In accordance with one embodiment of the present invention, the transmission of these control signals to the PA/LD 20 is performed digitally via the digital serial interface 50. Digital transmission of the control signals enables enhanced control of transceiver operations while minimizing the amount of control lines needed for such control. The glue logic device 34 is disposed as a component of the controller 18 to organize and arrange these digital control signals produced by the controller 18 before digital transmission to the PA/LD 20. Further details concerning the digital transmission of the control signals via the digital serial interface 50 are given below.

Reference is now made to FIG. 3, which depicts various aspects of the PA/LD 20. As already mentioned, the PA/LD 20 is disposed as an integrated circuit on the PCB 12 and is configured to condition data signals that are to be transmitted or that have been received by the optical transceiver 10. In presently preferred embodiments, the PA/LD 20 is an integrated device, in contrast to known optical transceivers that dispose the post-amplifier as a separate component from the laser driver. Integration of the post-amplifier and the laser driver into a single integrated circuit on the PCB 12 simplifies transceiver design and minimizes pin connections therein. Further details regarding the integrated post-amplifier/laser driver are given in the United States patent application entitled "Integrated Post-Amplifier and Laser Driver Assembly with Digital Control Interface," serial number pending, which is filed simultaneously herewith, and which is incorporated herein by reference in its entirety. It is appreciated that, in other embodiments, the post-amplifier and the laser driver can be disposed on the PCB 12 as discrete components.

As already mentioned, a plurality of control devices are disposed within the PA/LD 20 to control operational parameters of both the TOSA 14 and the ROSA 16. In particular, control amplifiers 36, 38, 40, and 46 are used to modify as needed the operational parameters of the optical transceiver 10. Particularly, the control amplifiers 36, 38, 40, and 46 are employed to modify operational parameters related to the TOSA 14, loss of signal circuitry, the ROSA 16, and the laser bias current, respectively. Various other circuitry and devices 47 are disposed on or in relation to the PA/LD 20 to assist with the operation of the PA/LD as described herein.

In greater detail, the control amplifier 36 is configured to modify parameters associated with electrical data signals received from a host device connected to the optical transceiver. These electrical data signals represent information from the host device that is to be converted to an optical signal and transmitted via the optical communications network to a remote device. As seen in FIG. 3, the incoming electrical data signal from the host device enters the PA/LD 20 and the control amplifier 36 via two opposite-polarity data lines 26A. The control amplifier 36 is configured to condition and amplify the electrical data signal before it is forwarded to the TOSA 14 via two opposite-polarity data lines 26B for conversion into an optical signal and transmission to the optical communications network. In the present embodiment, the control amplifier 36 is configured to adjust at least two parameters of the electrical data signal. Specifically, the control amplifier 36 is configured to adjust the rise time and amplitude of the electric data signal received from the host device. As will be explained, the magnitude of adjustment of these parameters is controlled via control signals sent by the controller 18 to the control amplifier 36.

In contrast, the control amplifier 40 is configured to condition and amplify an electrical data signal received from the ROSA 16 via opposite-polarity data lines 31B. This electric data signal represents information intended for the host device that has been previously converted by the ROSA 16 from an optical signal received from the communications network. After conditioning and amplification, the electrical signal is sent via opposite-polarity data lines 31A to a host device that is external to the optical transceiver 10. In the present embodiment, the control amplifier 40 is configured to adjust at least two parameters of the incoming electric data signal received from the ROSA 16. Specifically, the control amplifier 40 adjusts the rise time and amplitude of the electric data signal received from the ROSA 16. The magnitude of adjustment of these parameters is controlled via control signals sent by the controller 18 to the control amplifier 40, as detailed further below.

Similar in function to the control amplifiers 36 and 40, the control amplifier 38 is configured to condition and amplify a loss of signal alert signal sent from the PA/LD 20 via the control line 32B. As mentioned, this loss of signal alert is forwarded from the PA/LD 20 to the controller 18 when the strength of the optical signal being received from the optical network by the ROSA 16 drops below a specified level. In connection with this responsibility, the control amplifier 38 can in one embodiment also include an additional amplifier 37. At least two parameters, the threshold level and hysteresis of the loss of signal alert signal, can be modified by the control amplifier 38 according to control signals sent from the controller 18, as will be explained further below.

Finally, the control amplifier 46 is configured to condition the laser driver bias current that is supplied to the laser 22 via the current line 27. A reference voltage is supplied to the control amplifier 46 to enable current conditioning such that the laser 22 operates under ideal conditions.

It is appreciated that the number and particular configuration of the control amplifiers as described above can be varied without affecting the present invention. For instance, more or fewer control amplifiers can be utilized in the PA/LD, as well as control amplifiers that control operational parameters in addition to those discussed above. Further, control devices and other components that perform operations distinct from amplifying and conditioning transceiver signals can also be digitally controlled in accordance with the present invention. Thus, though the above discussion describes one embodiment where the present invention can be utilized, it should not be interpreted as being limiting of the invention in any way.

Continuing reference is made to FIG. 3, as well as to FIGS. 1 and 2, in describing various aspects of the present digital interface and associated components in accordance with one embodiment of the present invention. As described, the digital serial interface 50 is established between the controller 18 and the PA/LD 20 as a means for digitally transmitting digital control signals from the controller to the PA/LD, thereby enabling the controller to digitally control the operational parameters of the control amplifiers 36, 38, 40, and 46, or other control devices. In the present embodiment, the digital serial interface 50 comprises the first node 50A disposed on the controller 18 and a second node 50B disposed on the PA/LD 20. The digital nodes 50A and 50B can comprise any acceptable type of digital interface for transferring digital data, including those conforming to I2C and SPI protocols.

Three digital signal lines 52 are interposed between the two nodes 50A and 50B to enable various digital signals to be transferred therebetween. The first of these digital lines, 52A, is configured to transfer digital control signals from the controller 18 to one or more of the control amplifiers 36, 38, 40, and 46, or other control devices disposed in the PA/LD 20. The first digital signal line 52A can also be employed in one embodiment to transfer feedback data relating to the operation of the control devices from the PA/LD 20 back to the controller 18. The second digital signal line 52B is an enable line that is employed to coordinate the transfer of data between the controller 18 and the PA/LD 20 via the first signal line 52A. The third digital signal line 52C carries a clock signal so as to allow the controller 18 and the PA/LD 20 to coordinate the timing of data sent via the data line 52A. Though three digital signal lines 52 are shown here, it is appreciated that more or fewer than three lines 52 can extend between the nodes 50A and 50B. Indeed, a single digital signal line could be utilized, if desired. Also, each of the digital signal lines can be bi-directionally configured to enable data to flow in either direction between the controller 18 and the PA/LD 20, as explained further below. Further details regarding certain aspects of the digital serial interface and related components can be found in the United States patent application Ser. No. entitled "Optical Transceiver Module with Multipurpose Internal Serial Bus," filed on Oct. 8, 2002 (serial number 10/266,870 now patent number 6,913,361), which is incorporated herein by reference in its entirety.

As seen in FIG. 2, the first node 50A of the digital serial interface 50 is operably connected to the glue logic device 34 of the controller 18, as already discussed. Similarly, as seen in FIG. 3, the second node 50B of the digital serial interface 50 is operably connected to a glue logic device 44 of the PA/LD 20. The glue logic device 44 is responsible for directing control signals received from the controller 18 via the digital serial interface 50 to the proper control amplifier 36, 38, 40, or 46. Alternatively, the glue logic device 34 and 44 can comprise micro-controllers, if desired.

In addition, a plurality of digital-to-analog converters ("DACs") 43 is operably interposed between the glue logic device 44 and the control amplifiers 36, 38, 40, and 46. Each DAC 43 is configured to convert a digital control signal received from the glue logic device 44 into an analog control signal that can be used by the control amplifiers 36, 38, 40, and 46 to modify a respective operating parameter. In the present embodiment, two DACs 43 are interposed between the glue logic device 44 and each of the control amplifiers 36, 38, and 40. Specifically, in the case of control amplifier 40, one DAC 43A is disposed for converting digital signals sent from the glue logic device 44 to control the rise time of the converted data signal received by the control amplifier from the ROSA 16, while one DAC 43B is disposed for converting control signals relating to the amplitude of the converted data signal. In the case of control amplifier 38, DAC 43C is disposed for converting digital control signals relating to the loss of signal hysteresis, and DAC 43D for the loss of signal threshold. In the case of control amplifier 36, DAC 43E is disposed for converting digital control signals relating to the rise time of the electric data signal to be converted and transmitted by the TOSA 14, while the DAC 43F converts digital control signals relating to the amplitude of this data signal. Finally, one DAC 43G is disposed for converting digital control signals relating to the adjustment of the laser bias current via the control amplifier 46.

As is seen above, the controller 18 is operably connected to the control amplifiers 36, 38, 40, and amplifier 46 via the glue logic device 34, the digital serial interface 50, the glue logic 44, and the DACs 43. This configuration is presented as one embodiment of the present invention; other configurations that vary from that illustrated, such as the inclusion of components in addition to those described here, are also contemplated. Such other configurations include the use of more or fewer DACs than the number shown here to convert various operational parameters. Further, the glue logic device 44 as described herein is but one means for distributing digital control signals from the second node of the digital serial interface 50 to at least one of the digital-to-analog converters 43. Other devices with the same functionality can alternatively be used.

Continuing reference is made to FIGS. 1–3 in describing certain aspects of the operation of the optical transceiver 10 as described above in digitally controlling operational parameters of the above control devices 36, 38, 40, and 46. During transceiver operation, the controller 18 produces digital control signals data relating to one or more of the parameters that can be modified by the control devices 36, 38, 40, and 46, as described above. These digital control signals can be produced by the glue logic device 34, or by another component of the controller 18. In the present embodiment, the glue logic device 34 can combine the digital control signal with other digital control signals to form a digital data word. For example, the digital data word can have a size of 40 bits. The 40-bit word can be parsed by the glue logic device 34 into five eight-bit sized sections. Each eight-bit word section can be programmed to carry control signal data relating to a particular operational parameter to be modified. Thus, each digital data word can comprise data to modify a plurality of operational parameters. Alternatively, other configurations for parsing and combining the digital control signals could be employed.

Once the digital data word is formed by the glue logic device 34, it is delivered to the first node 50A of the digital serial interface 50, where it is digitally transmitted to the second node 50B via the first digital signal line 52A. In the present embodiment, the digital data word is transmitted via the first signal line 52A, while the enable signal line 52B and clock signal line 52C ensure that transmission of the digital data word to the second node 50B occurs successfully and in a proper time frame.

Once the digital data word is received by the second node 50B of the digital serial interface 50, it is forwarded to the glue logic device 44 of the PA/LD 20, where it is decoded into its respective eight-bit sections and temporarily stored in memory registers, if necessary. These digital data word sections are then forwarded by the glue logic device 44 to the respective DACs 43A–G described above that correspond to the particular parameter to be modified. In one exemplary implementation, for instance, a digital data word forwarded by the glue logic device 34 of the controller 18 to the glue logic device 44 of the PA/LD 20 via the digital serial interface 50 can comprise eight-bit word sections containing, among others, a control signal in the first word section to modify the rise time operational parameter of the control amplifier 40 and a control signal in the second word section to modify the amplitude parameter of the control amplifier 36. In this case, then, the first digital data word section is forwarded to the DAC 43A, while the second section is forwarded to the DAC 43F.

Each digital data word section, once received by the respective DAC 43 to which it corresponds as determined by the glue logic device 44, is converted by the DAC from a digital control signal to an analog control signal, making it usable by the corresponding control amplifier. Each analog control signal is then forwarded from the respective DAC to the corresponding control amplifier 36, 38, 40, or 46 that is operably connected to the DAC 43. Thus, in the exemplary implementation above, the converted analog control signal from the first data word section corresponding to the rise time operating parameter is directed from DAC 43A to the control amplifier 40, while the converted analog control signal from the second data word section corresponding to the amplitude parameter is directed from DAC 43F to the control amplifier 36. The analog control signal, once received by the corresponding control amplifier, modifies the parameter setting of the amplifier. This in turn enables the amplifier 36, 38, 40, or 46 to modify the respective data, LOS, or voltage signal passing through the amplifier. The parameter setting is retained by the amplifier until modified by a subsequent control signal sent by the controller 18. In this way, digital control of the various transceiver operating parameters is achieved. Because each digital data word sent by the controller 18 can comprise word sections, with each word section containing control signals for a different control amplifier, the parameters of multiple control amplifiers can be modified nearly simultaneously. The parameter modification process described above can be configured to occur periodically on a time increment basis. Alternatively, it can be configured to occur in response to an event detected by the controller 18 or by some other component.

In addition to the digital signal lines 52 that interconnect the PA/LD 20 with the controller 18, additional signal lines, such as receiver loss of signal line 32B and the transmitter disable line 32C, can also be configured as digital signal lines and routed to the controller 18 via the digital serial interface 50, or via other means, to enable masking and other conditioning of these digital signals to occur.

In one embodiment, data transfer via the digital serial interface 50 is bi-directional, thereby enabling the controller 18 to not only send control signals to the PA/LD control amplifiers, but also to receive data from these or other devices of the PA/LD 20. In this case, the PA/LD 20 further includes analog-to-digital converters ("ADCs," not shown) disposed between the control amplifiers 36, 38, 40, and 46, and the glue logic device 44. These ADCs can convert analog signals received from the control devices, such as the control amplifiers 36, 38, 40, and 46, into digital signals for transmission to the controller 18 via the glue logic device 44 and digital serial interface 50. Such feedback can enable the controller 18 to adjust or modify the control amplifiers 36, 38, 40, and 46 in direct response to conditions reported by the amplifiers themselves. The feedback produced by this embodiment can be monitored by the glue logic 34 or by another component of the controller 18.

Advantages gained from the present invention include simpler IC design, which results in reduced fabrication costs. Less space is occupied by the present design, enabling more flexibility in transceiver manufacture. Also, enhanced control over transceiver components is possible, given the ability of the present invention to digitally control a large number of parameters relating to transceiver operation.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An optical transceiver module, comprising:
   an optical transmitter assembly;
   an optical receiver assembly; and
   a printed circuit board having disposed thereon:
      a controller capable of producing digital control signals output via a bi-directional digital communications interface associated with the controller, wherein the digital communications interface is configured to transfer the digital control signals in accordance with a pre-defined protocol; and
      an integrated circuit component comprising:
         a digital communications interface configured to receive the digital control signals in accordance with the pre-defined protocol; and
         a post-amplifier and laser driver circuit, the post-amplifier and laser driver circuit including a plurality of control amplifiers each configured to modify at least one operating parameter in response to at least one of the digital control signals, the at least one operating parameter relating to the operation of the optical transceiver module.

2. An optical transceiver module as defined in claim 1, wherein the digital signal interface comprises a first node disposed on the controller, a second node disposed on the integrated circuit component, and at least one digital signal line connecting the first node with the second node.

3. An optical transceiver module as defined in claim 1, wherein, for each amplifier disposed in the integrated post-amplifier/laser driver, one digital-to-analog converter is disposed between the logic device and the respective amplifier for each operational parameter that can be modified by the respective amplifier.

4. An optical transceiver for use in transmitting and receiving optical signals to and from an optical communications network, the optical transceiver comprising:
- an optical signal transmitter assembly capable of transmitting optical signals to the optical communications network;
- an optical signal receiver assembly capable of receiving optical signals from the optical communications network; and
- a printed circuit board on which are disposed:
  - a controller capable of producing a plurality of digital control signals;
  - an integrated post-amplifier/laser driver comprising a single integrated circuit device, the post-amplifier/laser driver comprising:
    - a plurality of control amplifiers, each control amplifier configured to modify at least one operating parameter in response to control signals from the controller, the at least one operating parameter relating to the operation of the optical transceiver;
    - a digital interface operably interconnecting the controller component and the post-amplifier/laser driver, the digital interface configured to transmit digital control signals produced by the controller to the post-amplifier/laser driver, the digital interface comprising:
      - a first node disposed on the controller;
      - a second node disposed on the post-amplifier/laser driver;
    - at least two digital signal lines interconnecting the first node and the second node, wherein a first of the at least two digital signal lines is capable of carrying the digital control signals, and wherein a second of the at least two digital signal lines is capable of carrying a clock signal;
    - a logic device disposed on the post-amplifier/laser driver, the logic device configured to receive the digital control signals from the digital interface and distribute the digital control signals to the plurality of control amplifiers; and
    - a plurality of digital-to-analog converters interposed between the plurality of control amplifiers and logic device, each digital-to-analog converter configured to receive digital control signals from the logic device and convert them into analog control signals for receipt by the control amplifiers.

5. An optical transceiver as defined in claim 4, wherein the digital interface further comprises a third signal line interconnecting the first and second nodes of the digital interface, the third signal line capable of carrying an enable signal, the enable signal being used to confirm that a specified digital control signal has been transmitted from the controller to the post-amplifier/laser driver via the digital interface.

6. An optical transceiver as defined in claim 5, further comprising a plurality of analog-to-digital converters configured to enable feedback signals to be transmitted from the plurality of control amplifiers on the post-amplifier/laser driver to the controller.

7. An optical transceiver as defined in claim 6, further comprising a memory component disposed on the controller, the memory component capable of storing feedback signals received by the controller.

8. An optical transceiver device as defined in claim 7, further comprising a logic device disposed on the controller, the logic device of the controller configured to direct digital control signals produced by the controller component to the digital interface.

9. An optical transceiver as defined in claim 8, wherein the digital control signals produced by the controller are grouped by the logic device of the controller into digital data words before being transmitted to the post-amplifier/laser driver via the digital interface, and wherein each digital data word is divided into discrete digital control signals by the logic device disposed on the post-amplifier/laser driver.

10. An optical transceiver as defined in claim 9, wherein each of the logic devices comprises an integrated circuit.

11. An optical transceiver as defined in claim 9, wherein each of the logic devices comprises a micro-controller.

12. An optical transceiver as defined in claim 9, wherein one digital-to-analog converter is disposed between the logic device of the post-amplifier/laser driver and a respective one of the plurality of control amplifiers for each operating parameter that can be modified by the respective control amplifier.

13. An optical transceiver as defined in claim 12, wherein the plurality of control amplifiers further comprises:
- a first control amplifier configured to modify operating parameters related to optical signals to be transmitted by the optical signal transmitter assembly;
- a second control amplifier configured to modify operating parameters related to the loss of optical signals received by the optical signal receiver assembly;
- a third control amplifier configured to modify operating parameters related to incoming optical signals received by the optical signal receiver assembly; and
- a fourth control amplifier configured to modify operating parameters related to the bias current of a laser disposed in the optical signal transmitter assembly.

14. An optical transceiver as defined in claim 13, wherein the first, second, and third control amplifiers are each connected to two digital-to-analog converters.

* * * * *